(12) United States Patent
Lee et al.

(10) Patent No.: US 12,499,698 B2
(45) Date of Patent: Dec. 16, 2025

(54) METHOD FOR EXTRACTING CHARACTERS FROM VEHICLE LICENSE PLATE, AND LICENSE PLATE CHARACTER EXTRACTION DEVICE FOR PERFORMING METHOD

(71) Applicant: SK Telecom Co., Ltd., Seoul (KR)

(72) Inventors: Heeyul Lee, Seoul (KR); Chunghun Kang, Seoul (KR); YongSung Kim, Seoul (KR); Taewan Kim, Seoul (KR); Seungji Yang, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 315 days.

(21) Appl. No.: 18/116,582

(22) Filed: Mar. 2, 2023

(65) Prior Publication Data

US 2023/0206659 A1    Jun. 29, 2023

(51) Int. Cl.
| | |
|---|---|
| *G06V 20/70* | (2022.01) |
| *G06V 20/62* | (2022.01) |
| *G06V 30/148* | (2022.01) |
| *G06V 30/16* | (2022.01) |
| *G06V 30/18* | (2022.01) |
| *G06V 30/19* | (2022.01) |

(52) U.S. Cl.
CPC .......... *G06V 20/625* (2022.01); *G06V 20/70* (2022.01); *G06V 30/153* (2022.01); *G06V 30/16* (2022.01); *G06V 30/18* (2022.01); *G06V 30/19013* (2022.01); *G06T 2207/30252* (2013.01); *G06T 2210/12* (2013.01)

(58) Field of Classification Search
CPC .... G06V 20/625; G06V 20/70; G06V 30/153; G06V 30/16; G06V 30/18; G06V 30/19013; G06V 30/1444; G06V 30/18105; G06T 2207/30252; G06T 2210/12; G06T 3/40; G06T 7/90
See application file for complete search history.

(56) References Cited

U.S. PATENT DOCUMENTS

2022/0101037 A1*    3/2022  Chua ................... G06F 18/2415

FOREIGN PATENT DOCUMENTS

| KR | 10-2011-0115927 A | 10/2011 |
|---|---|---|
| KR | 101393391 B1 | 5/2014 |
| KR | 101851492 B1 | 4/2018 |

(Continued)

OTHER PUBLICATIONS

PCT International Search Report and Written Opinion, PCT Application No. PCT/KR2021/015057, Jan. 28, 2022, 12 pages.

(Continued)

*Primary Examiner* — Huo Long Chen
(74) *Attorney, Agent, or Firm* — WTA IP Law P.C.

(57) ABSTRACT

There is provided a method of extracting characters from a license plate of a vehicle performed by a license plate character extraction device. The method comprises: converting a input image obtained by capturing the license plate of the vehicle into a grayscale image; generating a converted image based on a result of comparing a value of at least one pixel included in the grayscale image with a first average of values of pixels adjacent to the at least one pixel; generating a refined image based on a result of comparing the converted image with a binarized image obtained by binarizing the converted image; and extracting characters included in the refined image.

15 Claims, 11 Drawing Sheets

(56) References Cited

FOREIGN PATENT DOCUMENTS

| KR | 20180049298 A | * | 5/2018 |
| KR | 101932631 B1 | * | 12/2018 |
| KR | 10-2019-0143525 A | | 12/2019 |
| KR | 20190143525 A | * | 12/2019 |

OTHER PUBLICATIONS

Office Action of the corresponding Korean Patent Application No. 10-2020-0139724 mailed on Sep. 11, 2025.

C. Peng et al., "A fast and noise tolerable binarization method for automatic license plate recognition in the open environment in Taiwan." Symmetry, 12(8), 1374.(Aug. 18, 2020).

J. Tian et al., "Chinese license plate character segmentation using multiscale template matching." Journal of Electronic Imaging, 25(5), 053005-053005.(Sep. 8, 2016).

X. Liu et al., "A New Color on Discrimination Based on Characteristics of the Vehicle License Plate Location." International Journal of Education and Management Engineering, 2(7), 61.(Jul. 29, 2012).

* cited by examiner

FIG.8A

| 52A 3108 |

FIG.8B

| 123A 4568 |

METHOD FOR EXTRACTING CHARACTERS FROM VEHICLE LICENSE PLATE, AND LICENSE PLATE CHARACTER EXTRACTION DEVICE FOR PERFORMING METHOD

CROSS-REFERENCE TO RELATED APPLICATIONS

This application is a bypass continuation of International PCT application No. PCT/KR2021/015057 filed on Oct. 26, 2021, which claims priority to Republic of Korea Patent Application No. 10-2020-0139724, filed on Oct. 26, 2020, which is incorporated by reference herein in their entirety.

TECHNICAL FIELD

The present disclosure relates to a method of extracting characters from a license plate of a vehicle and a license plate character extraction device for performing the same.

BACKGROUND

A license plate recognition system is a system that detects a license plate of a vehicle and recognizes characters on the license plate, and may be used to manage entrance and exit of the vehicle at a parking lot.

A process of capturing the license plate of the vehicle and separating license plate characters from the captured license plate is required in order to recognize the license plate of the vehicle in the license plate recognition system.

In a license plate recognition system of the related art, methods such as edge detection and binarization are used to separate the license plate characters from the license plate. In the edge detection and binarization methods, the license plate characters are separated using a threshold value, and there is a problem that a recognition rate of the license plate characters is not guaranteed when a brightness distribution in the entire license plate changes due to a change in position, brightness, or the like of a lighting.

SUMMARY

The present disclosure provides a method of comparing a value of a pixel with an average of values of pixels located around such a pixel to extract license plate characters from a captured image.

However, problems to be solved by the present disclosure are not limited to those mentioned above, and another problem to be solved that is not mentioned can be clearly understood by those skilled in the art from the description below.

In accordance with an aspect of the present disclosure, there is provided a method of extracting characters from a license plate of a vehicle performed by a license plate character extraction device, the method comprise: converting a input image obtained by capturing the license plate of the vehicle into a grayscale image; generating a converted image based on a result of comparing a value of at least one pixel included in the grayscale image with a first average value that indicates a mean value of pixels adjacent to the at least one pixel; generating a refined image based on a result of comparing the converted image with a binarized image obtained by binarizing the converted image; and extracting characters included in the refined image.

The generating of the converted image may include determining a converted value of the at least one pixel reflecting a result of comparing the value of the at least one pixel included in the grayscale image with the first average; and generating the converted image consisting of the at least one pixel having the converted value.

The method further comprises generating at least one label consisting of pixels having predetermined converted values and contacting each other by labeling the grayscale image.

The determining the converted value may include increasing the value of a pixel that is smaller than the first average among all the pixels in the grayscale image, and decreasing the value of a pixel that is equal to or greater than the first average among all the pixels in the grayscale image, when a label having a length equal to or greater than a predetermined length is not present in the grayscale image.

The method further comprises generating at least one label consisting of pixels having predetermined values and contacting each other by labeling the grayscale image.

The determining the converted value may include converting the value of a pixel that is equal to or smaller than the first average among all the pixels in the grayscale image, when a label having a length equal to or greater than a predetermined length is present in in the grayscale image.

The extracting the characters included in the refined image includes: determining a character bounding box of each of the characters included in the refined image; calculating a degree of overlap between the character bounding box and template bounding boxes included in respective predetermined license plate templates; and extracting the characters using a license plate template having the highest degree of overlap with the character bounding box among the predetermined license plate templates based on the calculated degree of overlap.

The method further comprises determining a second average of values of pixels having preset value or more among pixels included in a predetermined region in the converted image; and generating the binarized image from the converted image based on a result of comparing values of pixels included in the converted image with the second average.

In accordance with another aspect of the present disclosure, there is provided a license plate character extraction device, the device comprise: a camera configured to capture a license plate of a vehicle; a memory configured to store a license plate character extraction model for extracting characters from an image obtained by capturing the license plate of the vehicle; and a processor.

The processor is configured to: execute the license plate character extraction model, and convert the image obtained by capturing the license plate of the vehicle into a grayscale image, generate a converted image based on a result of comparing a value of a pixel included in the grayscale image with a first average of values of pixels surrounding the pixel, generate a refined image based on a result of comparing the converted image with a binarized image obtained by binarizing the converted image, and extract characters included in the refined image.

The processor is configured to: determine a converted value of the at least one pixel reflecting a result of comparing the value of the at least one pixel included in the grayscale image with the first average, and generate the converted image consisting of the at least one pixel having the converted value.

The processor is configured to: generate at least one label consisting of pixels having predetermined converted values and contacting each other by labeling the grayscale image, and increase the value of a pixel that is smaller than the first average among all the pixels in the grayscale image, and decrease the value of a pixel that is equal to or greater than the first average among all the pixels in the grayscale image, when a label having a length equal to or greater than a predetermined length is not present in the grayscale image.

The processor is configured to: generate at least one labels consisting of pixels having predetermined values and contacting each other by labeling the grayscale image, and convert the value of a pixel that is equal to or smaller than the first average among all the pixels in the grayscale image, when a label having a length equal to or greater than a predetermined length is present in the grayscale image.

The processor is configured to: determine a character bounding box of each of the characters included in the refined image, calculate a degree of overlap between the character bounding box and template bounding boxes included in respective predetermined templates, and extract the characters using a license plate template having the highest degree of overlap with the character bounding box among the predetermined license plate templates based on the calculated degree of overlap.

The processor is configured to: determine a second average of values of pixels having preset value or more among pixels included in a predetermined region in the converted image, and generate the binarized image from the converted image based on a result of comparing values of pixels included in the converted image with the second average.

In accordance with another aspect of the present disclosure, there is provided a non-transitory computer-readable storage medium including computer executable instructions, wherein the instructions, when executed by a processor, cause the processor to perform a method of extracting characters from a license plate of a vehicle, the method comprising: converting a input image obtained by capturing the license plate of the vehicle into a grayscale image; generating a converted image based on a result of comparing a value of at least one pixel included in the grayscale image with a first average of values of pixels adjacent to the pixel; generating a refined image based on a result of comparing the converted image with a binarized image obtained by binarizing the converted image; and extracting characters included in the refined image.

The generating the converted image includes determining a converted value of the at least one pixel reflecting a result of comparing the value of the at least one pixel included in the grayscale image with the first average; and generating the converted image value consisting of the at least one pixel having the converted value.

The method further comprises: generating at least one label consisting of pixels having predetermined converted values and contacting each other by labeling the grayscale image.

The determining the converted value includes increasing the value of a pixel that is smaller than the first average among all the pixels in the grayscale image, and decreasing the value of a pixel that is equal to or greater than the first average among all the pixels in the grayscale image, when a label having a length equal to or greater than a predetermined length is not present in a predetermined region in the grayscale image.

The method further includes: generating at least one label consisting of pixels having predetermined values and contacting each other by labeling the grayscale image.

The determining the converted value includes converting the value of a pixel that is equal to or smaller than the first average among all the pixels in the grayscale image, when a label having a length equal to or greater than a predetermined length is present in the grayscale image.

The extracting of the characters included in the refined image includes: determining a character bounding box of each of the characters included in the refined image; calculating a degree of overlap between the character bounding box and template bounding boxes included in respective predetermined license plate templates; and extracting the characters using a license plate template having the highest degree of overlap with the character bounding box among the predetermined license plate templates based on the calculated degree of overlap.

The method further comprises: determining a second average of values of pixels having preset value or more among pixels included in a predetermined region in the converted image; and generating the binarized image from the converted image based on a result of comparing values of pixels included in the converted image with the second average.

According to an embodiment of the present disclosure, the value of the pixel is compared with the average of the values of the pixels located around such a pixel, and the license plate characters are extracted from the image, making it possible to guarantee a certain high recognition rate regardless of change in a position or brightness of a lighting.

BRIEF DESCRIPTION OF THE DRAWINGS

FIGS. 8A and 8D illustrate examples of license plate templates according to an embodiment of the present disclosure.

DETAILED DESCRIPTION

Figure 1:
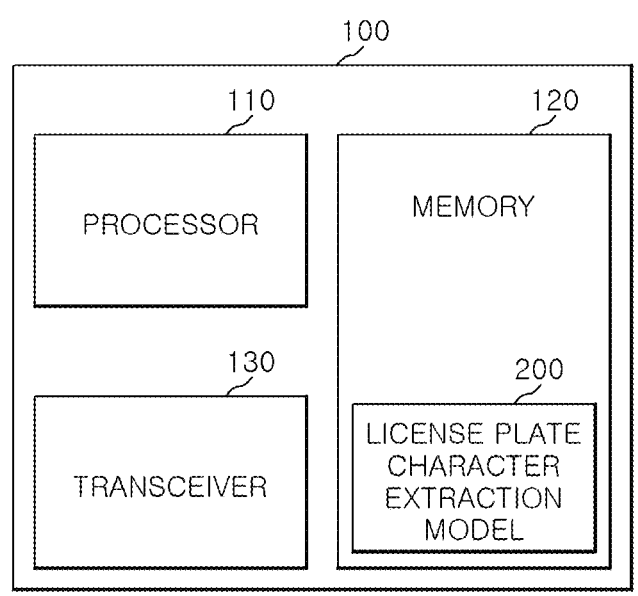
FIG. 1 is a block diagram illustrating a license plate character extraction device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram illustrating a license plate character extraction device according to an embodiment of the present disclosure.

Figure 2:
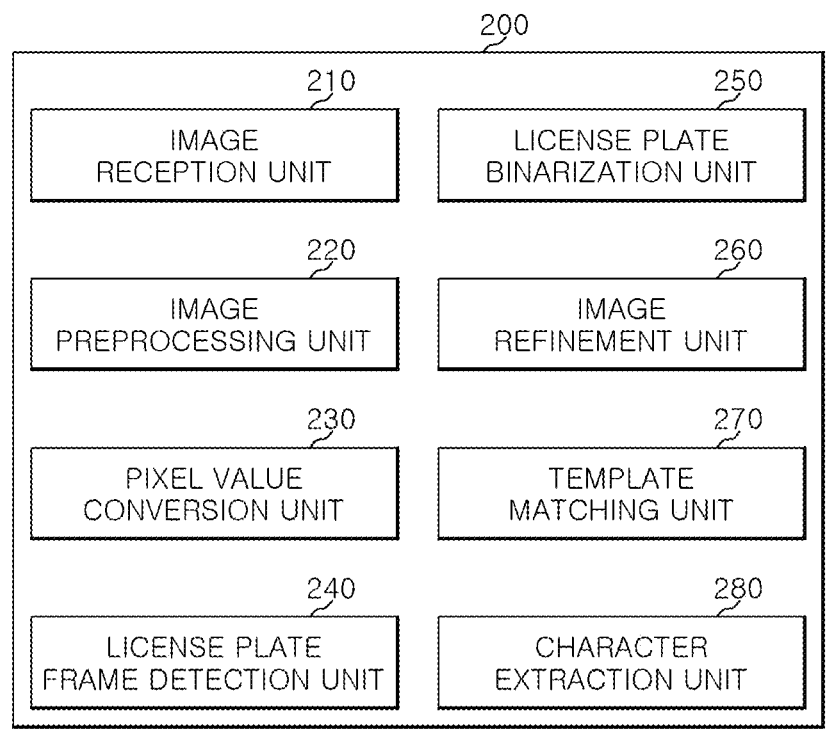
FIG. 2 is a block diagram conceptually illustrating a function of a license plate character extraction model according to an embodiment of the present disclosure.

Referring to FIGS. 1 and 2, the vehicle license plate character extraction apparatus 100 may include a processor 110, a memory 120 and a transceiver 130.

The processor 110 may control overall functions of the vehicle license plate character extraction device 100.

The memory 120 may store a license plate character extraction model 200 and information necessary for execution of the license plate character extraction model 200.

In the present specification, the license plate character extraction model 200 means software (computer program code) for performing a function of extracting license plate characters from an image obtained by capturing a license plate of a vehicle, or a set thereof, and may be implemented by a series of instructions.

The processor 110 may load the license plate character extraction model 200 and the information required for execution of the license plate character extraction model 200 stored in the memory 130 in order to execute the license plate character extraction model 200.

The processor 110 may execute the license plate character extraction model 200 to convert an image of the license plate of the vehicle received from a camera (not illustrated) into a grayscale image, extract a converted image obtained by converting a pixel value of the license plate characters from the grayscale image, detect a license plate frame from the converted image, binarize the converted image to generate a binarized image, refine the binarized image using the converted image from which the license plate frame has been detected, and match the refined image with a license plate template to extract the license plate characters. The license plate characters in the present specification refer to characters constituting a number of a vehicle on a license plate, and may include numbers as well as the characters.

The processor 110 may control at least one of the memory 120 and the transceiver 130 to execute the license plate character extraction model 200.

A function of the license plate character extraction model 200 will be described in greater detail with reference to FIG. 2.

The transceiver 130 may receive the image of the license plate of the vehicle from the camera (not illustrated) that captures the license plate of the vehicle.

In the present specification, a case in which the image of the license plate of the vehicle is received from the camera (not illustrated) using the transceiver 130 has been described, but the present disclosure is not limited thereto. That is, according to the embodiment, the license plate character extraction device 100 may include an input and output device (not illustrated), and the license plate character extraction device 100 may receive the image of the license plate of the vehicle using the input and output device.

FIG. 2 is a block diagram conceptually illustrating a function of a license plate character extraction model according to an embodiment of the present disclosure.

Referring to FIG. 2, the license plate character extraction model 200 may include an image reception unit 210, an image preprocessing unit 220, a pixel value conversion unit 230, a license plate frame detection unit 240, a license plate binarization unit 250, an image refinement unit 260, a template matching unit 270, and a character extraction unit 280.

In the license plate character extraction model 200 illustrated in FIG. 2, the image reception unit 210, the image preprocessing unit 220, the pixel value conversion unit 230, the license plate frame detection unit 240, the license plate binarization unit 250, the image refinement unit 260, the template matching unit 270, and the character extraction unit 280 are obtained by conceptually dividing the function of the license plate character extraction model 200 in order to easily explain the function of the license plate character extraction model 200, and the present disclosure is not limited thereto. That is, according to embodiments, in the license plate character extraction model 200, functions of the image reception unit 210, the image preprocessing unit 220, the pixel value conversion unit 230, the license plate frame detection unit 240, the license plate binarization unit 250, the image refinement unit 260, the template matching unit 270, and the text extraction unit 280 can be merged or separated, and can be implemented by a series of instructions included in one or more programs.

The image reception unit 210 may receive an image obtained by capturing a license plate of a vehicle using a camera 120.

The image preprocessing unit 220 may correct the received image of the license plate of the vehicle when the received image of the license plate of the vehicle does not satisfy a preset criterion according to the embodiment.

The preset criterion includes whether or not the license plate is tilted at a preset angle (for example, 5 degrees) or more in the image of the license plate of the vehicle, whether or not the license plate of the vehicle includes a center of the image, and whether or not horizontal and vertical lengths of the license plate are equal to or larger than half of horizontal and vertical lengths of the image.

For example, when the license plate is tilted at the preset angle (for example, 5 degrees) or more in the image of the license plate of the vehicle, the image preprocessing unit 220 can reduce the tilt of the license plate by performing warping.

Further, when the license plate of the vehicle does not include the center of the image, the image preprocessing unit 220 may move the license plate of the vehicle, receive the image of the license plate of the vehicle again, or capture the license plate of the vehicle from the entire image again to correct the image so that the license plate of the vehicle includes the center of the image.

Finally, when the horizontal length of the license plate is smaller than the half of the horizontal length of the image, or the vertical length of the license plate is smaller than the half of the vertical length of the image, the image preprocessing unit 220 may receive the image of the license plate of the vehicle again or capture the image of the license plate of the vehicle from the entire image again, and correct the image so that the horizontal and vertical lengths of the license plate are equal to or larger than the half of the horizontal and vertical lengths of the image.

The image of the license plate of the vehicle received by the image reception unit 210 may be a color image or a grayscale image.

When the image reception unit 210 receives the color image, the image preprocessing unit 220 may convert the received color image into a grayscale image. This is intended to reduce the complexity of extraction of the license plate characters because the background of the license plate or the color of the license plate characters is not fixed.

According to the embodiment, the image preprocessing unit 220 may perform smoothing on the image of the license plate of the vehicle. This is intended to prevent a problem that the accuracy of extraction of the license plate characters degrades from occurring due to a case in which a character is cut due to noise in the image or the background and the characters are merged. Since the smoothing is a known technology, description thereof will be omitted.

The pixel value conversion unit 230 may amplify the pixel value of the license plate characters in the grayscale image of the license plate of the vehicle in order to separate the license plate characters from the license plate of the vehicle. In the related art, binarization is performed on the entire image using a threshold value, but in this case, there is a problem that accuracy of character extraction varies due to change in distribution of lightings.

To solve this problem, the pixel value conversion unit 230 may determine whether or not the color value of the pixel is to be converted using color values of pixels located around the pixel instead of the threshold value, to separate the characters from the grayscale image.

More specifically, the pixel value conversion unit 230 may compare the value of the pixel with an average of values of pixels located around the pixel, and determine whether or not the value of the pixel is to be converted according to a result of the comparison. Here, the pixels located around the pixel may refer to pixels adjacent to the pixel and located within a predetermined distance or range from the pixel.

According to the embodiment, the pixel value conversion unit 230 may convert values of pixels included in the grayscale image of the license plate of the vehicle using Equation 1 below to generate a converted image.

$$D(p) = \begin{cases} 255 - G(p), & \text{if } G(p) < M(p) \\ 0, & \text{otherwise} \end{cases} \quad \text{[Equation 1]}$$

Here, D(p) may mean a value of a pixel p in a converted image D, G(p) may mean the value of the pixel p in a grayscale image G, and M(p) may mean an average of values of pixels located around the pixel p.

That is, when the value of the pixel p in the grayscale image G(p) representing the license plate of the vehicle is smaller than (or equal to or smaller than) the average M(p) of the values of surrounding pixels, the pixel value conversion unit 230 may determine that the color of the pixel p is black (or a color closer to black), and determine a value obtained by subtracting a value G(p) of the pixel p from 255 to be the value of the pixel p in the converted image D.

On the other hand, when the value of the pixel p in the grayscale image G(p) representing the license plate of the vehicle is greater than (or exceeds) the average M(p) of the values of the surrounding pixels, the pixel value conversion unit 230 may determine that the color of the pixel p is white (or a color closer to white), and determine the value of the pixel p in the converted image D to be 0.

Figure 3A:
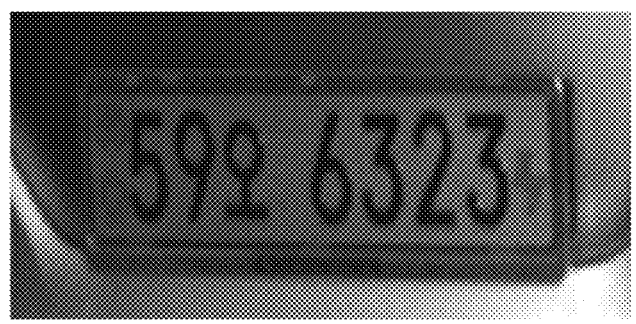
FIGS. 3A and 3B illustrate an example of a gray image and a changed image in which values have been changed from the gray image.
Figure 3B:
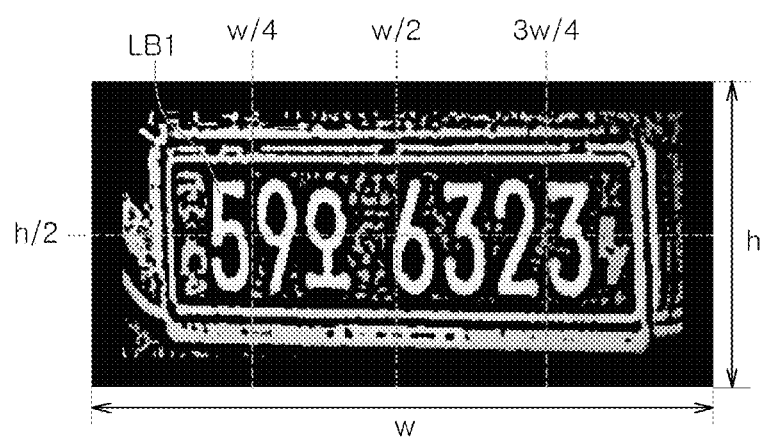

For example, referring further to FIG. 3A, FIG. 3A illustrates the grayscale image G before the grayscale image G is converted into the converted image D, and FIG. 3B illustrates the grayscale image G converted from the converted image G using Equation 1.

As illustrated in FIGS. 3A and 3B, a dark region such as license plate characters or a license plate frame (that is, a region in which G(p)<M(p) in Equation 1) may be converted to a blight region in the converted image (that is, the pixel value D(p) may be amplified to the value obtained by subtracting the value G(p) of the pixel p from 255), and a bright region such as a background inside or outside the license plate (that is, a region corresponding to otherwise in Equation 1)) may be converted to a black region in the converted image (that is, the pixel value D(p) may be converted to 0).

Figure 4A:
FIGS. 4A and 4C illustrate another example of the gray image and the changed image in which the values have been changed from the gray image.
Figure 4B:
Figure 4C:

However, referring further to FIGS. 4A to 4C, there may be a license plate with white license plate characters depending on a type of license plate of the vehicle.

Therefore, when the grayscale image of FIG. 4A is substituted into Equation 1, a bright region such as license plate characters or a license plate frame in the grayscale image (that is, a region corresponding to otherwise in Equation 1) is converted to a black region in the converted image (that is, the pixel value D(p) is converted to 0), and a dark region such as a background inside or outside the license plate (that is, a region in which G(p)<M(p) in Equation 1) may be converted to a bright region in the converted image (that is, the pixel value D(p) can be amplified to the value obtained by subtracting the value G(p) of the pixel p from 255), as illustrated in FIG. 4B.

That is, as can be seen from FIGS. 3 and 4, a part in which the pixel value is amplified in the grayscale image may be different depending on the type of license plate. Therefore, in order to obtain the same converted image regardless of the type of license plate, the pixel value conversion unit 230 needs to determine whether a region in which the pixel value has been amplified in an image acquired by substituting the grayscale image into Equation 1 is a character region of the license plate or a background region of the license plate.

To this end, the pixel value conversion unit 230 may perform labeling on the converted image acquired using Equation 1.

Here, the labeling may refer to may refer to a process of forming adjacent pixels having the same pixel value as one group by setting adjacent (that is, connected) pixels having the same pixel value (or a pixel value that is in a predetermined range or equal to greater than a predetermined pixel value) (here, the pixel value is greater than 0) in the image to the same label. For example, since pixels constituting a number 5 in FIG. 3B are adjacent to each other and have the same pixel value equal to or greater than a predetermined value, the pixels constituting the number 5 may form one label LB1. On the other hand, in FIG. 4B, since pixels located outside a border of numbers 8646 are adjacent to each other and have the same pixel value equal to or greater than a predetermined value, pixels located outside the border of the numbers 8646 and surrounding the numbers 8646 may form one label (LB2).

That is, when it is assumed that a horizontal length and a vertical length of the converted image are w and h, respectively, and each license plate character in the converted image forms a label, a horizontal length of the label of the license plate character should be smaller than w/4 since at least four license plate characters should be present in the converted image. On the other hand, when it is assumed that a background forms the label in the converted image, a label with a length greater than w/4 may be present at a center of the license plate.

Therefore, when the horizontal length of the label coming into contact with a line segment connecting (w/4, h/2) to (3w/4, h/2) in the converted image is smaller than w/4 (that is, when there is no label with the horizontal length greater than w/4), the pixel value conversion unit 230 may determine that the license plate characters have been amplified. For example, referring further to FIG. 3B, labels coming into contact with the line segment connecting (w/4, h/2) to (3w/4, h/2) in the converted image are {9}, { 오 }, {6}, {3}, {2} and some small labels in the background, and since none of {9}, { 오 }, {6}, {3}, {2} and the some small labels in the background have the horizontal length greater than w/4, the pixel value conversion unit 230 may determine that the license plate characters have been amplified.

On the other hand, when the horizontal length of the label coming into contact with the line segment connecting (w/4, h/2) to (3w/4, h/2) in the converted image is larger than w/4, the pixel value conversion unit 230 may determine that the background of the license plate has been amplified. For example, referring further to FIG. 4B, the label coming into contact with the line segment connecting (w/4, h/2) to (3w/4, h/2) in the converted image is the label LB2 located outside the border of the numbers 8646 and surrounding the numbers 8646 and, since a horizontal length of the label LB2 is greater than w/4 (that is, a length from the leftmost side to the rightmost side of the label is greater than w/4), the pixel value conversion unit 230 can determine that the background of the license plate has been amplified.

Therefore, when a determination is made that the license plate background is amplified, the pixel value conversion unit 230 may convert the pixel value of the grayscale image using Equation 2 below instead of using Equation 1, to generate a converted image in FIG. 4C.

$$D(p) = \begin{cases} G(p), & \text{if } G(p) < M(p) \\ 0, & \text{otherwise} \end{cases} \quad \text{[Equation 2]}$$

In the present specification, a horizontal length of the label may mean a difference between an x-coordinate of the leftmost pixel and an x-coordinate of the rightmost pixel among pixels included in the label. Further, a vertical length of the label, as will be described below, may mean a difference between a y-coordinate of the uppermost pixel and a y-coordinate of the lowermost pixel among the pixels included in the label.

Further, in the present specification, for convenience of description, the converted image may be expressed as a rectangle whose vertices are (0, 0), (0, h), (w, 0), and (w, h).

The license plate frame detection unit 240 may detect the license plate frame from the converted image generated by the pixel value conversion unit 230.

More specifically, the license plate frame detection unit 240 may perform scanning up, down, left, and right from a center of the converted image, and determine points at which a label having a horizontal length equal to or greater than a predetermined length (for example, w/4) is encountered as points at which upper, lower, left, and right sides of the license plate frame are located when the label is encountered.

Figure 5A:
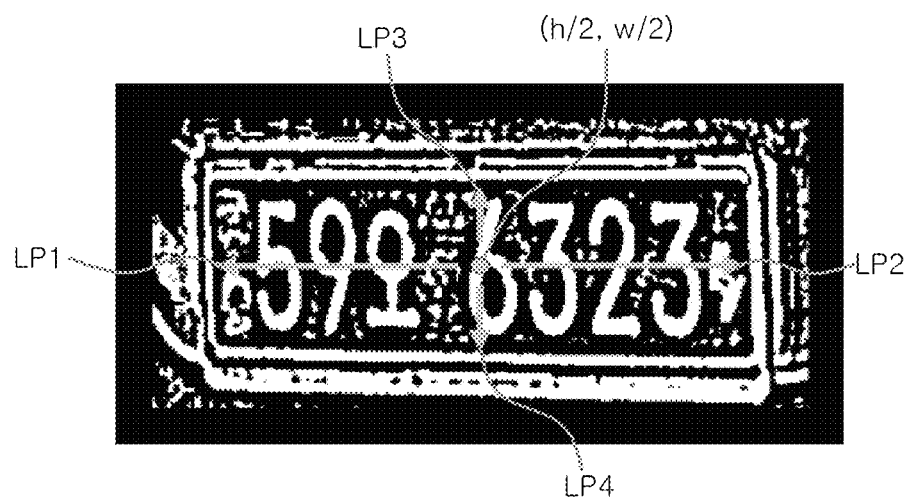
FIGS. 5A and 5B are an example illustrating a process of detecting a license plate frame in a license plate frame detection unit according to an embodiment of the present disclosure.
Figure 5B:
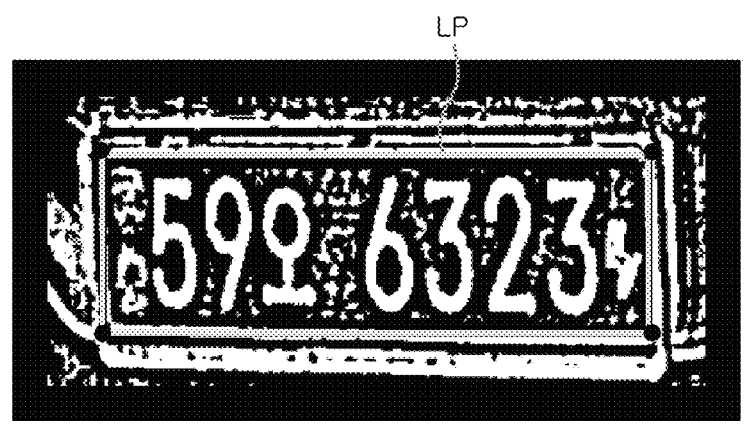

For example, referring to FIGS. 5A to 5C, when the license plate frame detection unit 240 performs scanning to the left from a center (w/2, h/2) of the converted image, the label for ' 오 ', the label for '9', and the label for '5' can be encountered in order during scanning.

However, since horizontal lengths of the label for ' 오 ', the label for '9', and the label for '5' do not exceed w/4, the license plate frame detection unit 240 may continue the scanning.

Then, since the horizontal length of the label scanned at the first point LP1 is equal to or greater than w/4, the license plate frame detection unit 240 may determine that the left side of the license plate frame is located at the first point LP1.

When the same process is performed to the right, up, and down from the center (w/2, h/2), the license plate frame detection unit 240 may determine that the right side of the license plate frame is located at the second point LP2, determine that the upper side of the license plate frame is located at the third point LP3, and determine that the lower side of the license plate frame is located at the fourth point LP4.

When a rectangle connecting the first point LP1, the second point LP2, the third point LP3, and the fourth point LP4 is formed as illustrated in FIG. 5B, the license plate frame detection unit 240 can detect a license plate frame LP.

The license plate binarization unit 250 may binarize the converted image generated by the pixel value conversion unit 230. Here, the binarization may mean expressing an image in black and white, unlike a grayscale image expressing an intensity of light (intensity of light). As illustrated in FIGS. 3A and 3B, in the pixel value conversion unit 230, when a character-converted image is generated, not only the license plate characters but also parts of the background inside or outside the license plate may be amplified (that is, values of pixels corresponding to the part of the background inside or outside the license plate can also be amplified). Accordingly, the license plate binarization unit 250 may binarize the converted image in order to remove the unnecessarily amplified background inside or outside the license plate from the converted image.

When it is assumed that the label is present at a middle height of the converted image, the license plate binarization unit 250 may calculate a threshold value on a line connecting the middle height (that is, h/2) for binarization.

More specifically, the license plate binarization unit 250 may calculate an average of values of pixels whose pixel values have been amplified (that is, pixels whose pixel values are not 0) among pixels located on a line segment connecting (0, h/2) to (w−1, h/2) while scanning the line segment from left to right, and determine the calculated average as the threshold value.

The license plate binarization unit 250 may compare the threshold value with the values of the pixels included in the converted image, and generate the binarized image on the basis of a result of the comparison.

That is, the license plate binarization unit 250 may change the value of the pixel to '0' when the value of the pixel included in the converted image is smaller than (or equal to or smaller than) the threshold value, and may not change the value of the pixel or change the value of the pixel to a predetermined value equal to or greater than '0' when the value of the pixel included in the converted image is equal to or greater than (or exceeds) the threshold value, to generate the binarized image.

Figure 6:
FIG. 6 illustrates an example of a binarized image generated by a license plate binarization unit according to the embodiment of the present disclosure.

Referring further to FIG. 6, the image illustrated in FIG. 6 may be the binarized image generated by the license plate binarization unit 250. When the binarized image illustrated in FIG. 6 is compared with the converted image illustrated in FIG. 3B, it can be confirmed that the amplified parts of the backgrounds inside and outside of the license plate have been greatly removed through the binarization.

The image refinement unit 260 may compare the binarized image generated by the license plate binarization unit 250 with the converted image from which the license plate frame has been detected by the license plate frame detection unit 240, to generate a refined image. More specifically, the image refinement unit 260 may generate the refined image through the following three steps.

In a first step, the image refinement unit 260 may perform labeling on the binarized image and remove labels that do not overlap labels included in the binarized image from among labels included in the converted image. This is intended to remove labels located in a background of the converted image.

In a second step, the image refinement unit 260 may remove labels located outside the license plate frame from the converted image from which the labels that do not overlap the labels included in the binarized image have been removed through the first step. Here, the labels located outside the license plate frame may include not only labels that are entirely located outside the license plate frame, but also labels that are partially located outside the license plate frame. This is because the labels located outside the license plate frame do not correspond to the license plate characters.

In a third step, the image refinement unit 260 may remove labels having a length greater than a preset value from among the labels included in the binarized image. Here, the length greater than the preset value may include the horizontal length of the label greater than w/4 and the vertical length of the label greater than 0.9 h. This is because it is recognized that the horizontal length is not greater than w/4, and the license plate character is not larger than 0.9 times the vertical length of the grayscale image since the license plate includes at least four license plate characters. However, the horizontal length and the vertical length serving as criteria for removing labels may be different depending on embodiments.

According to the embodiment, when it is not necessary to perform the third step, the image refinement unit 260 may perform only the first step and the second step.

The image refinement unit 260 may generate the refined image through the above steps.

Figure 7:
FIG. 7 illustrates an example of a refined image generated by an image refinement unit according to an embodiment of the present disclosure.

Referring further to FIG. 7, an image illustrated in FIG. 7 may be the refined image generated using the converted image from which the license plate frame has been detected in FIG. 5B and the binarized image illustrated in FIG. 6. It can be confirmed from FIG. 7 that all labels other than the license plate characters have been removed through the purification process of the first to third steps.

The template matching unit 270 may compare pre-input license plate templates with the refined image to determine a matching template that matches with the refined image among the license plate templates.

More specifically, the template matching unit 270 may compare regions of interest included in each license plate template with regions of interest included in the refined image and determine a template with the most matching regions of interest as the matching template.

Here, the region of interest included in the license plate template may be a region representing a region in which one character is located in the license plate template. Regions of interest as many as the number of characters included in the license plate template may be set in the license plate template in advance, and for example, the regions of interest included in the license plate template may be bounding boxes.

Further, the regions of interest included in the refined image are regions in which the license plate characters included in the refined image are marked, and may be, for example, bounding boxes.

When the template matching unit 270 receives the refined image, the template matching unit 270 may detect the regions of interest included in the refined image.

More specifically, the template matching unit 270 may detect the label for each of the license plate characters in the refined image in order to detect the region of interest from the refined image. For example, the template matching unit 270 may determine a label having a horizontal length and a vertical length within a preset range among the labels included in the refined image, to be the label for the license plate character.

The template matching unit 270 may calculate the horizontal length and the vertical length of the label for the license plate character, and set the region of interest to have the same horizontal and vertical lengths as the horizontal and vertical lengths of the label for the license plate character, or to have lengths that are predetermined margin larger than the horizontal and vertical lengths of the label for the license plate character.

According to the embodiment, the template matching unit 270 may apply a refined image having set regions of interest for the license plate characters and license plate templates having preset regions of interest to Equation 3 below to determine the matching template.

$$\text{includeness}(A, B) = \prod_n \max_m (I + \text{includeness}(A_n, B_m)), \text{ where} \quad \text{[Equation 3]}$$

$$\text{includeness}(A, B) = \max\left(\frac{\text{area}(A \cap B)}{\text{area}(A)}, \frac{\text{area}(A \cap B)}{\text{area}(B)}\right)^2$$

Here, $A_n$ represents an n-th region of interest of a license plate template A, $B_m$ represents an m-th region of interest of a refined image B, includeness ($A_n$, $B_m$) represents a degree of overlap between the n-th region of interest of the license plate template A and the m-th region of interest of the refined image B, region (A) represents a width of the region of interest of the license plate template A, and region (A∩B) represents a width of an region in which the region of interest of the license plate template A overlaps the region of interest of the refined image B.

Therefore, the template matching unit 270 may determine an overlap value of the most overlapping region of interest among the regions of interest ($B_m$) included in the refined image B, for each of the regions of interest ($A_n$) included in the license plate template A, and multiply the determined overlap values to determine a matching template most matched with the refined image among the license plate templates.

That is, the template matching unit 270 may determine the license plate template having the greatest includeness of Equation 3 among the license plate templates as the matching template.

Figure 9:
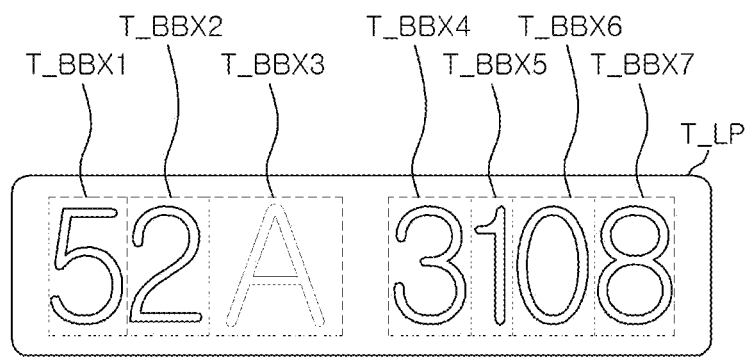
FIG. 9 illustrates a form in which regions of interest are set in the license plate template of (a) of FIG. 8.

Referring further to FIGS. 8 to 10, FIGS. 8A to 8D illustrate examples of license plate templates, FIG. 9 illustrates a license plate template T_LP in which regions of interest T_BBX1 to T_BBX7 are preset, and FIG. 10 illustrates a process in which the template matching unit 270 causes regions of interest of the license plate template to correspond to the refined image to obtain a matching template.

Figure 10A:
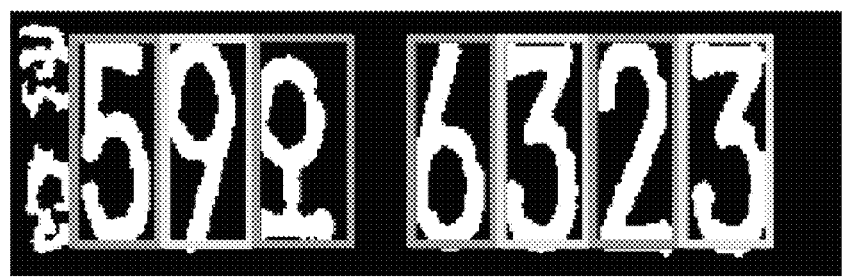
FIGS. 10A and 10B illustrate an example of a process of obtaining a matching template in a template matching unit according to an embodiment of the present disclosure.
Figure 10B:
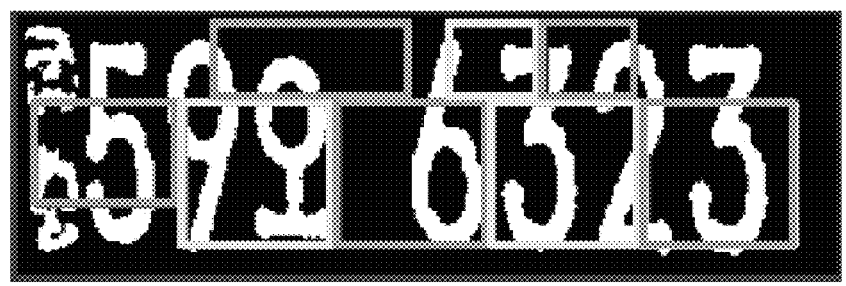

It can be confirmed from FIG. 10A that, when the license plate template T_LP illustrated in FIG. 8A among FIGS. 8A to 8D and FIG. 9 is caused to correspond to the refined image in FIG. 7, the regions of interest of the refined image much overlap the regions of interest T_BBX1 to T_BBX7 of the license plate template T_LPi On the other hand, it can be confirmed from FIG. 10B that, when the license plate template illustrated in FIG. 8C among FIGS. 8A to 8D is caused to correspond to the refined image in FIG. 7, the regions of interest of the refined image overlap the regions of interest of the license plate template in a lower degree of overlap than that illustrated in FIG. 10.

This makes it possible for the template matching unit 270 to determine the license plate template T_LP of FIG. 8A to be the matching template.

The character extraction unit 280 may extract only license plate characters from the refined image using the determined matching template.

More specifically, the character extraction unit 280 may cause the region of interest included in the matching template to correspond to the refined image, and delete the labels not included in the regions of interest of the license plate template from among the labels included in the refined image, to finally extract the license plate characters.

Here, being included in the regions of interest of the license plate template may mean that the entire label of the refined image is included in the region of interest of the license plate template, but may mean that a preset range or more of the label of the refined image is included in the region of interest of the license plate template.

Figure 11:
FIG. 11 illustrates an example of license plate characters extracted by a character extraction unit according to an embodiment of the present disclosure.

Referring further to FIG. 11, FIG. 11 illustrates license plate characters extracted by the character extraction unit 280. It can be confirmed from FIG. 11 that only the license plate characters can be extracted from the license plate through operations of the template matching unit 270 and the character extraction unit 280.

Figure 12:
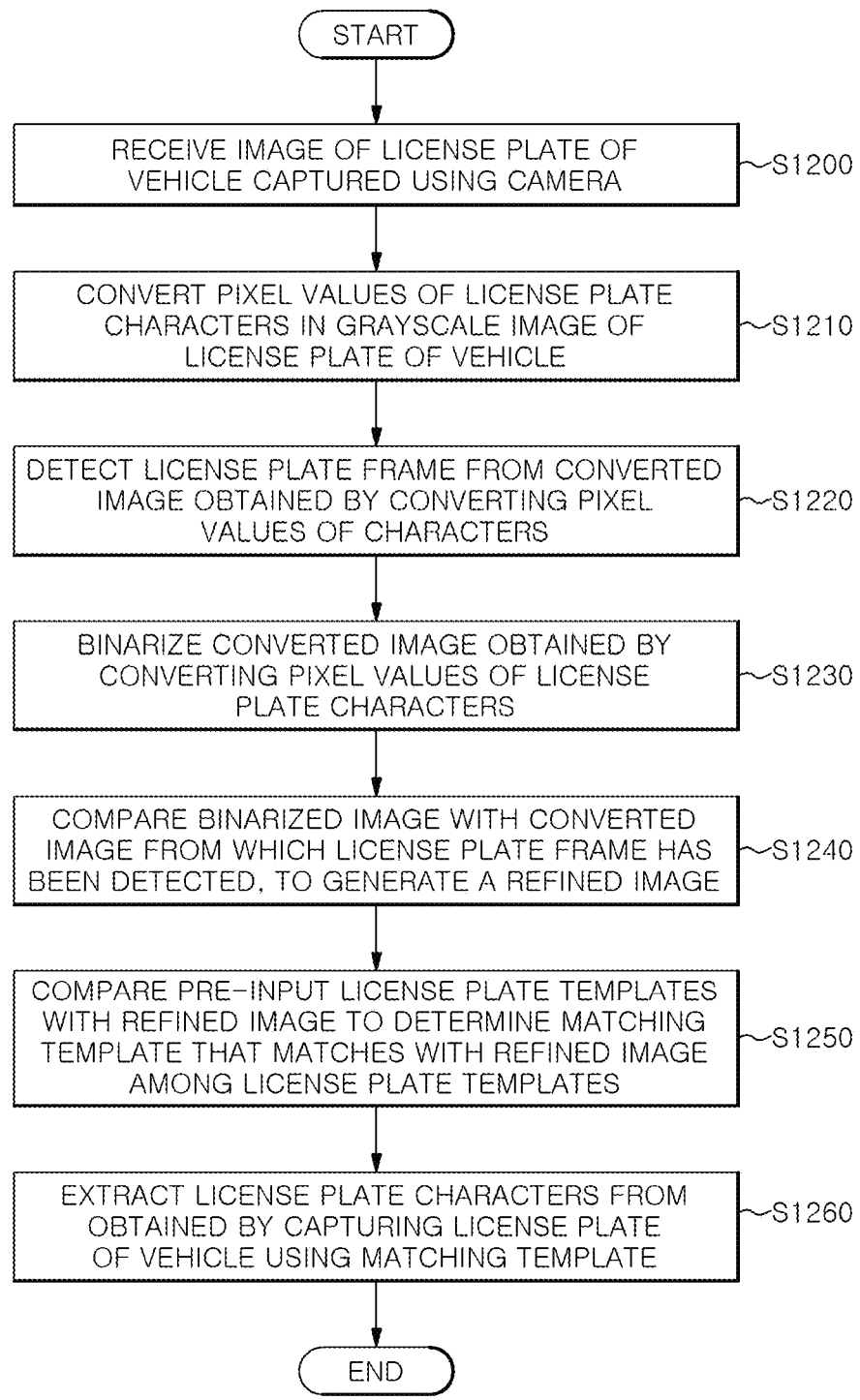
FIG. 12 is a flowchart illustrating a method of extracting license plate characters of a vehicle according to an embodiment of the present disclosure.

FIG. 12 is a flowchart illustrating the method of extracting license plate characters of a vehicle according to an embodiment of the present disclosure.

Referring to FIGS. 2 and 12, when the image reception unit 210 receives the image of the license plate of the vehicle captured using the camera 120 (S1200), the pixel value conversion unit 230 may convert the pixel values of the license plate characters (that is, values of pixels corresponding to the license plate characters) in the grayscale image of the license plate of the vehicle (S1210).

Thereafter, the license plate frame detection unit 240 may detect the license plate frame from the converted image obtained by converting the pixel values of the characters (S1220), and the license plate binarization unit 250 may binarize the converted image obtained by converting the pixel values of the license plate characters (S1230).

In the present specification, a case in which the license plate frame detection unit 240 detects the license plate frame in the converted image and then the license plate binarization unit 250 binarizes the converted image has been described for convenience of description, but the present disclosure is not limited thereto. That is, according to the embodiment, the detection of the license plate frame and the binarization of the converted image may be simultaneously performed, or the binarization of the converted image may be performed first, and then the detection of the license plate frame may be performed.

The image refinement unit 260 may compare the binarized image obtained by binarizing the converted image with the converted image from which the license plate frame has been detected, to generate a refined image obtained by refining the labels of the converted image using the binarized image (S1240).

The template matching unit 270 may compare pre-input license plate templates with the refined image to determine the matching template that matches with the refined image among the license plate templates (S1250).

The character extraction unit 280 may extract the license plate characters from the license plate of the vehicle using the matching template determined by the template matching unit 270 (S1260).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method of extracting characters of a license plate, the method comprising:
   receiving an input image including a license plate of a vehicle captured by a camera;
   grayscaling the input image into a grayscale image;
   comparing a value of at least one pixel included in the grayscale image with a first average of values of pixels adjacent to the at least one pixel to generate a converted image;
   generating a refined image by at least comparing the converted image with a binarized image obtained by binarizing the converted image; and
   extracting characters included in the refined image by:
      determining character bounding boxes of the characters in the refined image,
      determining a degree of overlap between the determined character bounding boxes and bounding boxes in a plurality of templates, each of the plurality of templates defining a different layout of the bounding boxes corresponding to expected positions of characters, and
      extracting the characters from the refined image using one of the plurality of templates having a highest degree of overlap with the character bounding boxes of the refined image.

2. The method according to claim 1, wherein the the converted image is generated by:
   determining a converted value of the at least one pixel reflecting a result of comparing the value of the at least one pixel included in the grayscale image with the first average; and
   updating the at least one pixel to have the converted value.

3. The method according to claim 2, further comprising:
   generating at least one label including pixels having predetermined converted values and contacting each other in the grayscale image,
   wherein determining the converted value includes increasing a value of a first pixel that is smaller than the first average, and decreasing a value of a second pixel that is equal to or greater than the first average, when a label having a length equal to or greater than a predetermined length is not present in the grayscale image.

4. The method according to claim 2, further comprising:
   generating at least one label including pixels having predetermined pixel values and contacting each other in the grayscale image,
   wherein determining the converted value includes converting a value of a pixel that is equal to or smaller than the first average, when a label having a length equal to or greater than a predetermined length is present in in the grayscale image.

5. The method according to claim 1, further comprising:
   determining a second average of values of pixels having a preset value or more included in a predetermined region in the converted image; and
   generating the binarized image from the converted image based on a result of comparing values of pixels included in the converted image with the second average.

6. A license plate character extraction device comprising:
   a camera configured to capture an input image including a license plate of a vehicle;
   one or more processors; and
   a memory storing instructions thereon, the instructions when executed by the one or more processors cause the one or more processors to
      receive the input image from the camera,
      grayscale the input image into a grayscale image,
      generate a converted image based on a result of comparing a value of a pixel included in the grayscale image with a first average of values of pixels surrounding the pixel,
      generate a refined image by at least comparing the converted image with a binarized image obtained by binarizing the converted image,
      determine character bounding boxes of characters in the refined image,
      determine a degree of overlap between the determined character bounding boxes and bounding boxes in a plurality of templates, each of the plurality of templates defining a different layout of the bounding boxes corresponding to expected positions of characters, and
      extract the characters from the refined image using one of the plurality of templates having a highest degree of overlap with the character bounding boxes of the refined image.

7. The license plate character extraction device according to claim 6, wherein the instructions cause the one or more processors to:
   determine a converted value of the at least one pixel reflecting a result of comparing the value of the at least one pixel included in the grayscale image with the first average, and
   update the at least one pixel to have the converted value.

8. The license plate character extraction device according to claim 7, wherein the instructions cause the one or more processors to:
   generate at least one label including pixels having predetermined converted values and contacting each other in the grayscale image, and when a label having a length equal to or greater than a predetermined length is not present in the grayscale image:
    increase a value of a first pixel that is smaller than the first average in the grayscale image, and
    decrease a value of a second pixel that is equal to or greater than the first average.

9. The license plate character extraction device according to claim 7, wherein the instructions cause the one or more processors to:
    generate at least one labels including pixels having predetermined values and contacting each other in the grayscale image, and
    convert a value of a pixel that is equal to or smaller than the first average, when a label having a length equal to or greater than a predetermined length is present in the grayscale image.

10. The license plate character extraction device according to claim 6, wherein the instructions cause the one or more processors to:
    determine a second average of values of pixels having preset value or more included in a predetermined region in the converted image, and
    generate the binarized image from the converted image based on a result of comparing values of pixels included in the converted image with the second average.

11. A non-transitory computer-readable storage medium including computer executable instructions, wherein the instructions, when executed by one or more processors, cause the one or more processors:
    receive an input image captured by a camera,
    grayscale the input image into a grayscale image;
    generate a converted image based on a result of comparing a value of at least one pixel included in the grayscale image with a first average of values of pixels adjacent to the pixel;
    generate a refined image by at least comparing the converted image with a binarized image obtained by binarizing the converted image;
    determine character bounding boxes of characters in the refined image,
    determine a degree of overlap between the determined character bounding boxes and bounding boxes in a plurality of templates, each of the plurality of templates defining a different layout of the bounding boxes corresponding to expected positions of characters, and
    extract the characters from the refined image using one of the plurality of templates having a highest degree of overlap with the character bounding boxes of the refined image.

12. The non-transitory computer-readable storage medium according to claim 11, wherein the instructions cause the one or more processors to:
    determine a converted value of the at least one pixel reflecting a result of comparing the value of the at least one pixel included in the grayscale image with the first average; and
    update the at least one pixel to have the converted value.

13. The non-transitory computer-readable storage recording-medium according to claim 12, wherein the instructions further cause the one or more processors to:
    generate at least one label including pixels having predetermined converted values and contacting each other in the grayscale image,
    when a label having a length equal to or greater than a predetermined length is not present in the grayscale image:
    increase a value of a first pixel that is smaller than the first average, and
    decrease a value of a second pixel that is equal to or greater than the first average.

14. The non-transitory computer-readable storage medium according to claim 12, wherein the instructions cause the one or more processors to:
    generate at least one label including pixels having predetermined values and contacting each other in the grayscale image,
    convert a value of a pixel that is equal to or smaller than the first average, when a label having a length equal to or greater than a predetermined length is present in the grayscale image.

15. The non-transitory computer-readable storage medium according to claim 11, wherein the instructions cause the one or more processors to:
    determine a second average of values of pixels having preset value or more among pixels included in a predetermined region in the converted image; and
    generate the binarized image from the converted image based on a result of comparing values of pixels included in the converted image with the second average.

* * * * *